(Model.) 2 Sheets—Sheet 1.

G. D. WALCOTT.
METHOD OF AND MEANS FOR DRAWING THE TINES OF AGRICULTURAL FORKS.

No. 245,909. Patented Aug. 16, 1881.

Attest:
R. H. Barnes
E. F. Dick

Inventor:
Geo. D. Walcott
by M. Bailey
Attorney (Model.)
2 Sheets—Sheet 2.
G. D. WALCOTT.
METHOD OF AND MEANS FOR DRAWING THE TINES OF AGRICULTURAL FORKS.
No. 245,909.                     Patented Aug. 16, 1881.
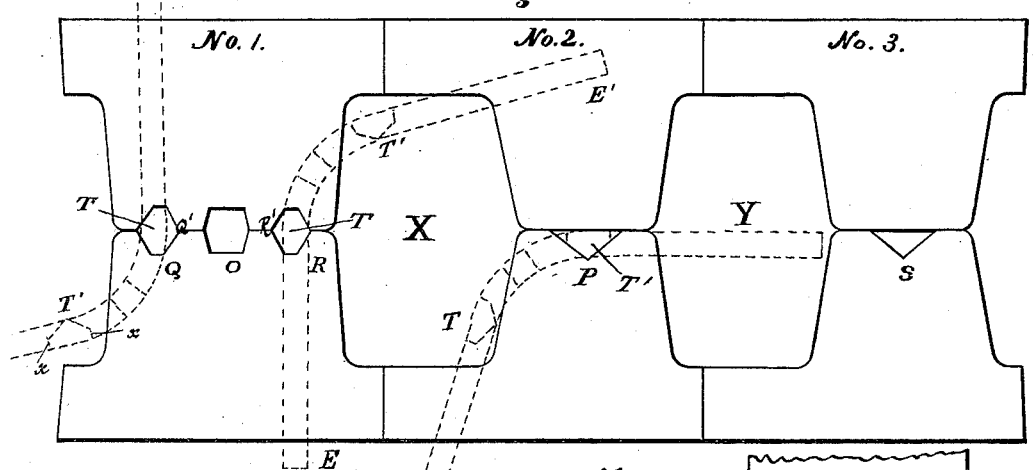
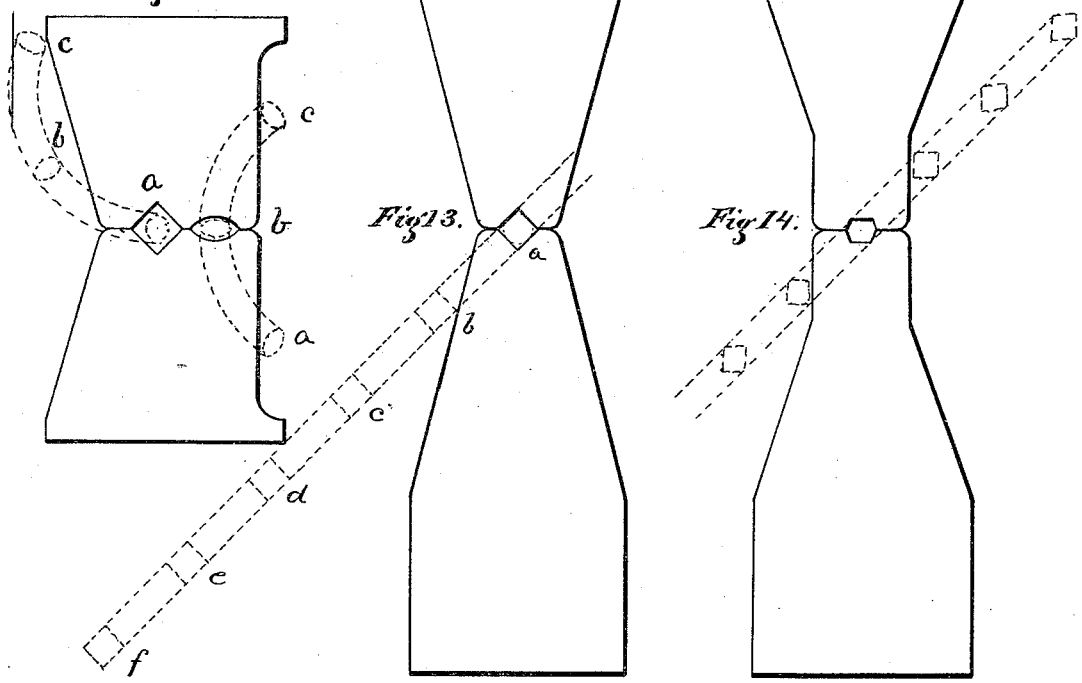
Witnesses:
C. L. Walcott
E. A. Walcott
Inventor:
Geo. D. Walcott

UNITED STATES PATENT OFFICE.

GEORGE D. WALCOTT, OF JACKSON, MICHIGAN.

METHOD OF AND MEANS FOR DRAWING THE TINES OF AGRICULTURAL FORKS.

SPECIFICATION forming part of Letters Patent No. 245,909, dated August 16, 1881.

Application filed February 11, 1881. (Model.)

*To all whom it may concern:*

Be it known that I, GEORGE D. WALCOTT, of the city of Jackson, Michigan, have invented certain new and useful Improvements in the Method of and Means for Drawing the Tines of Agricultural Forks, of which the following is a specification.

This invention relates to the dies for and the method of drawing the tines of agricultural forks.

The object of my invention is to adapt rolls and the dies thereto attached to rolling four or five or more tined forks as well as they are now adapted to rolling two and three tined forks. This I accomplish by a peculiar set of dies and a peculiar form of the blank from which the fork is to be drawn.

The mechanism employed, as far as is new, is illustrated by the accompanying drawings.

Figure 15:
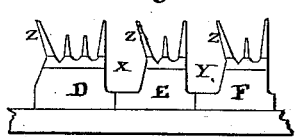
Figure 10:
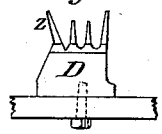
Figure 1:
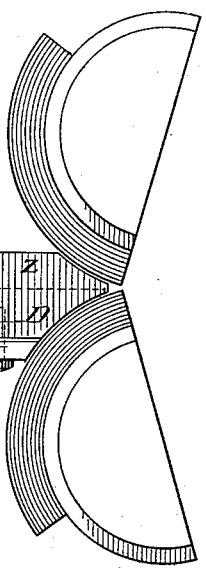
Figure 2:
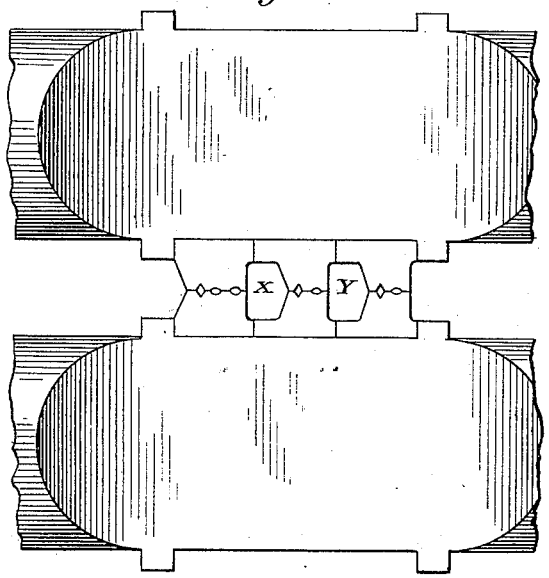
Figures 5, 6, 7, 8:
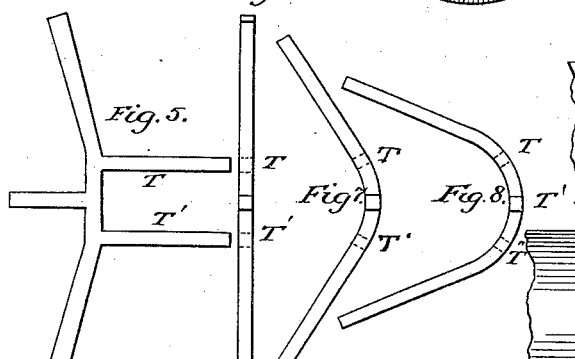
Figure 4:
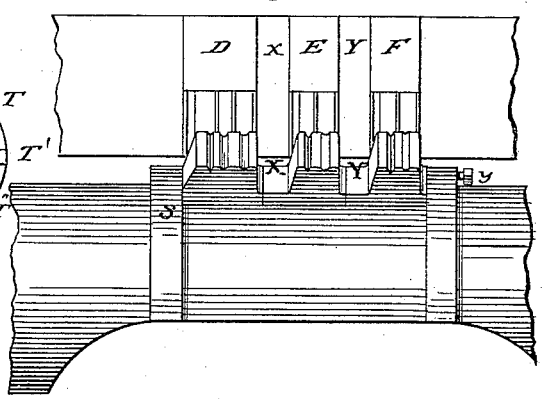
Figure 9:
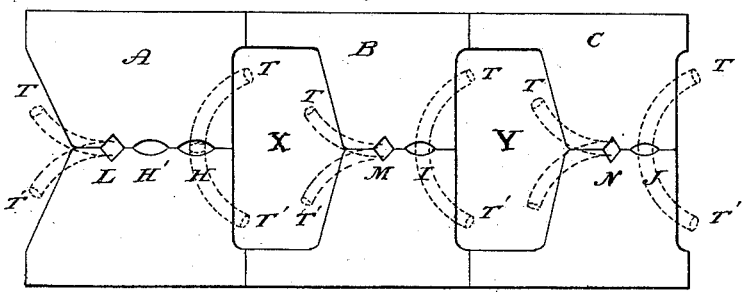

Figure 1 shows a vertical section of rolls with dies and guide-board; Fig. 2, a front elevation of that part of rolls to which dies are attached, showing dies in position; Fig. 4, a plan view of same, with gage and guide pieces in their relative positions. Fig. 5 is a plan of a four-tined fork or spade-fork blank, formed to be drawn under a hammer. Fig. 6 is an edge view of said blank; Fig. 7, the same after being bent to the form necessary for drawing the two inner tines by rolls, in accordance with my invention. Fig. 8 is a blank for a five-tined fork, bent to form for drawing the three inner tines by rolls. Fig. 9 is a front elevation, on an enlarged scale, of the dies for drawing four-tined forks. Fig. 10 is a front view of gage and guide piece for first die. Fig. 11 is a front elevation of dies for spade-forks. Fig. 12 is a front elevation of one of a set of dies for five-tined forks. Fig. 13 is a front elevation of one of a set of dies for drawing square-tined forks. Fig. 14 is a front elevation of one of a set of dies for drawing diamond-tined forks. Fig. 15 is a front elevation of a set of gage and guide-pieces for four-tined forks.

The section of the dies for four-tined forks and spades is in the form of the letter T or L, having a width at the base on the rolls as much greater than the working-surface as may be needed to give the spaces X Y of any desired width and height, for purposes hereinafter mentioned. The dies are of segmental form, and may be of any desired length to half the circumference of the roll. The rolls and dies may be of any desired practical diameter and length. The dies may be fastened onto the rolls, either by pressing them together and against a shoulder, S, as shown in Fig. 4, by means of screws *y*, or they may be separated and fastened to the rolls each by itself, thus leaving the space between dies deeper. By this means, and by placing the dies farther apart, a fork with greater number of tines may be drawn.

The dies for four-tined forks and spades are preferably fitted together at the lower edge and held on their seat by means of a dovetailed shoulder at S and screw opposite at *y*, Fig. 4.

The dies for four-tined forks are shown in section, Fig. 9, three in number, though for some forks it may be best to use a fourth, which may be readily done by adding a duplicate of either the second or third dies. The first die, A, has three grooves, the first a V-shaped or edging groove, the second a flat, and the third a flat. The second and third dies, and also the fourth die, if it is used, have each an edging and a flat or drawing groove. The edging-groove is preferably placed on the left edge of dies and the flat or drawing groove on the right edge; but the arrangement may be reversed, if for any reason it is better. The center groove in first die is used only on the outer tines.

One essential part of my invention is the peculiar form of the dies, with wide seats and narrow working surfaces, forming the spaces or openings X Y, in which the inner tine or tines, not being drawn, may "run idle" between the rolls while one of the set of inner tines is being drawn in the grooves. The fork-blank which is worked in these dies should, before its inner tines are drawn, have its bar bent as shown in Figs. 7 and 8, so that tines that are being drawn may be placed both flat and edgewise in the grooves, while the other inner tine or tines run free on the outer side of the dies or in the spaces X Y.

Another feature of my invention is the form of edging-groove in spade-dies.

Another feature of my invention is in the guide-pieces, formed as hereinafter described, and made to correspond in width and shape to the dies, thus allowing of better adjustment.

To illustrate the working of my invention, I will describe the method of drawing four-tined forks.

With a blank, Fig. 5, (which is in shape to be drawn under a hammer,) and the dies, Fig. 9, in the rolls, and the gage-pieces D E F, Fig. 15, in position as shown in Figs. 1, 2, and 4, the operator first takes the blank, and, after heating it properly, bends it to the form shown by Fig. 7, in a small hand-press, or a suitably-constructed drop or power press. The tine T' is then placed in the gage so as to be operated upon by the edging-groove L of die A, Fig. 9, while the tine T runs free at left-hand side of upper die A, as indicated by the upper dotted lines on the left of Fig. 9. The tine T is next operated upon by same grooves, while tine T' runs free at left-hand side of lower die A, as indicated by the lower dotted lines on the left of Fig. 9. Then, with but very little change of position, the tine T' is placed in gage-piece so as to be operated upon the flat way by the groove H, while tine T runs free in space X, on right-hand side of upper die A. Tine T is in turn operated upon by same groove, while T' runs free in space X, on right-hand side of lower die A. Then the operator, by a very simple movement up and to the left, places the tine T' in the edging-groove M of dies B, tine T running free in upper part of space X. Next, by turning the tongs half over in the hand, the tine T is in position to be placed on the guide or gage to be operated on edgewise, and tine T' runs free in lower part of space X. Next, by a slight movement up and to the right, T' may be placed in the guide or gage to be operated upon the flat way by the groove I, while tine T runs free in upper part of space Y. Then, by turning the tongs about one-quarter in the hands, the tine T may be placed so as to be operated on by the groove I, while T' runs free in lower part of space Y. Thus it will be seen that two tines are being drawn at one heat, it being necessary to run each tine twice in the grooves H and M, and some tines twice in the grooves I and N, and then finish them in the flat groove J. This is easily done, the operator having drawn the two inner tines of four-tined forks in eighteen passes at a single heat, or nine passes for each tine, and at the rate of fifty passes per minute while drawing. The center groove, H', in first die is for reducing the outer tine so that it may be worked by the other grooves without flashes. It is larger than the third groove H. This is necessary, inasmuch as outer tines are much heavier at outer end, as shown by Fig. 5, and must be reduced before working in the flat grooves prepared for inner tines. Therefore the tine is given one or two passes in this and the first edging-groove, L, after which it may be finished in other grooves of the series, the same as inner tines. The guide-pieces for this set of dies are made of same width, or nearly so, as the dies, being just enough narrower to allow of adjustment, and the sides Z, Figs. 1, 10, 15, are made to conform to the shape of the section of each die, so that all the space between the dies may be utilized, in order to more readily place the tines in position to be worked. They are made high and flush with the outside of the die, to prevent the possibility of turning the tine that is running free between dies onto the working-surface of the same, and so spoil it. These gage and guide pieces (lettered D, E, and F) are supported on a suitable stationary part of the machine, in the position indicated in side elevation, Fig. 1, and plan, Fig. 4. The top face of the plate on which the guide pins or ribs are erected lies in the horizontal plane of contact of the die-rolls, and the nose of this plate constitutes the gage to determine the extent to which the blank may enter. The section of the base of the guide corresponds with or has the same form as the section of the lower die opposite to it, and the wings or side plates, Z, which extend up, as shown in Figs. 1, 10, and 15, a distance about equal to the thickness of the upper dies, and conform on their outer faces to the shape and inclination of the sides of said upper dies, prevent those tines which are contained in the spaces X or Y from accidentally getting between the working-faces of the dies. With this arrangement the operator is so aided that but little attention on his part insures placing the tine in its proper position.

For drawing four-tined spades the dies shown by Fig. 11 are used, No. 1 having two edging-grooves, Q R, and a central breaking-down groove, O, for the outer tines, which, like those of four-tined forks, are largest on the outer end. Dies Nos. 2 and 3 are very similar, each upper die being plain, each of the lower ones having a V-shaped groove, that in No. 2 being somewhat larger than that in No. 3, which is the finishing-groove. The method of drawing spade-forks with these dies is very similar to that of drawing four-tined forks. The dies and gage or guide pieces being in place, and the pattern having been heated and bent, the operator places the left-hand tine, T, Fig. 11, so as to be operated upon edgewise by the groove Q, while the tine T' runs free on outer side of lower die. The tine T' is then operated on by same groove, and tine T left to run free outside of upper die. Tine T is then run the flat way in the groove P of die No. 2, while T' runs free in lower part of space Y. T' is then run in same groove, while T runs free in lower part of space X. The tine T is now in such position as to be readily placed in edging-groove R, with T' free in upper part of space X. Tine T is next edged in same groove, and T' left to run free in lower part of space X. The tines are passed through the two grooves R and P two or three times, until about drawn out, when the tines are finished by passing through the groove S of No. 3. In drawing the outer tines they are first reduced by passing through the groove O on edge, next flatwise through P, next edging through Q, next flatwise through P. Then the grooves P and R are used alternately until the tine is about drawn out, when it is finished in groove S. The grooves Q and R are peculiar in their form and working, in that they may be used for edging a V-shaped tine, whichever side up the tine may be. The advantage of this is seen in drawing the outer tines, when it is handiest and easiest to have the two inner tines that have been previously drawn hang down while edging the outer tines. This form of groove will allow of so doing, inasmuch as it is alike on both sides, there being room, in the relief given the sides of the grooves, to allow the back of tine to run free in groove while the edges are being reduced. This is shown in die No. 1. Groove Q has the tine T with the back or bottom to the right, while groove R has the tine T the opposite way. Neither one of the grooves Q and R require to be relieved on the inner side, Q' R', for drawing the inner tines; but for drawing the outer tines they must be thus relieved, unless the central or inner tines are made to project up when drawing the right-hand outer tine and down when drawing the other. The section of these tines is shown in dotted lines at T', die No. 1, Fig. 11, where it will be noticed that the edges of the tine are not sharp, but have flat surfaces x, which alone are acted upon in edging up, the sides of the grooves only acting to keep the tine upright.

For drawing five-tined forks it is necessary to have more room. Fig. 12 shows the form of die necessary. It differs from those for drawing four-tined forks only in being higher, and that the center groove in the first die must be dispensed with, as in edging up the center tine the tines on either side must have room to run free outside of the dies. Fig. 12 represents one of three or four dies, as may be desired, used to form a set. The operation of drawing with these dies is so similar as to need no explanation. The form of blank bent ready to draw is shown by Fig. 8. Fig. 13 represents one of a set of dies for drawing forks with more than five square tines—for it will be readily understood that square tines and round tines on forks of four or five tines may be drawn the same as four-tined oval or four-tined spades; the grooves only require to be different. These dies can have but one groove in each, and therefore the number of dies must be increased, and also the distance at which they are set from one another; but there is nothing impracticable in this, and to draw diamond tines the same general form of dies with properly-formed grooves will answer.

Figs. 11 to 14, inclusive, represent dies half size, or about that. I give the bracing form to the sides of the dies, to give strength enough to use cast-iron chilled dies.

Having described my invention, what I claim, and desire to secure by Letters Patent, is—

1. In machinery for drawing the tines of agricultural forks, the combination, with the rolls, of a series of dies having drawing and edging grooves, each pair of dies being separated from those contiguous, so as to leave spaces X or Y between the working parts of the edging-dies, in which the tine or tines not operated on can run freely, substantially as hereinbefore set forth.

2. The series of dies formed with an edging-groove on one edge and a flat or drawing groove on the opposite edge, the dies which compose the series being separated or set at a distance from one another on the rolls, so as to obtain spaces X or Y between the working parts of adjoining dies.

3. The combination, with the rolls and their series of dies, provided with drawing and edging grooves, and separated from one another by spaces X or Y, of the guide-pieces, provided with corresponding grooves and separated from one another by spaces which correspond to the spaces X Y, and are bounded by the side pieces, Z, substantially as and for the purposes hereinbefore set forth.

4. The series of dies A, B, and C, Fig. 9, with edging-grooves L, M, and N next to one edge of dies, and the flat or drawing grooves H, I, and J next the other edge of same, the body of the dies made narrower than the base, for the purpose of forming spaces X Y between the dies, and the first die having a central groove for assisting in drawing the outer tines of same fork, as shown and described.

GEO. D. WALCOTT.

Witnesses:
E. A. WALCOTT,
C. L. WALCOTT.